Patented Feb. 13, 1940

2,190,239

UNITED STATES PATENT OFFICE 2,190,239

ADHESIVE

Adolf Menger, Krefeld-Uerdingen, Germany, assignor, by mesne assignments, to Plaskon Company, Incorporated, Toledo, Ohio, a corporation of Delaware No Drawing. Application January 9, 1935, Serial No. 1,069. In Germany January 16, 1934

3 Claims. (Cl. 260—29)

The present invention relates to the manufacture of adhesives comprising water-soluble urea-aldehyde condensation products, having incorporated therewith a phenol and an aldehyde or a condensation product derived from a phenol and an aldehyde.

The object of the present invention is the manufacture of an adhesive for glueing or cementing together working or construction materials of all kinds, such as, for example, pasteboard, vulcanized fibre, textiles as well as leather with wood and in particular for cementing wood.

It is known to glue or cement wood pieces together particularly in forming ply-wood and furniture wood by employing aqueous solutions of condensation products of urea, thiourea or derivatives thereof and aldehydes, particularly formaldehyde or polymers thereof if necessary or required with the use of hardening agents for these condensation products, such as acids, acid salts or substances which split off acids.

As a result of further investigation and research it has been found in accordance with the present invention that the technical adhesive properties of the above mentioned adhesives of urea-aldehyde condensation products can be considerably enhanced by the presence therein of phenol-aldehyde condensation products capable of hardening. The phenol-aldehyde condensation products can be incorporated as such in a water-soluble or emulsified state with the adhesives. It is, however, preferred to incorporate the individual components, that is to say the phenol and aldehyde separately with the adhesive before the application of the same; the formation of the phenol-aldehyde condensation product then proceeds in the adhesive mixture. It is especially recommended that the urea-aldehyde condensation products be employed in the form of the solutions obtainable in accordance with German Patent 550,647 of May 14, 1932.

Among the compounds which are suitable as hardening agents for the urea-aldehyde condensation products may be mentioned acids, such as hydrochloric acid, sulphuric acid, phosphoric acid, acetic acid, oxalic acid, lactic acid, acid salts, such as for example, acid sodium sulphate, ammonium phosphate and aluminum chloride, as well as substances, which split off acids on incorporation with the adhesive mixture, such as for example, ammonium chloride and ammonium sulphate.

Among the phenols adapted for use as components of the phenol aldehyde condensation products may be mentioned: phenols, such as phenol itself, cresol, xylenol, naphthol and dihydroxydiphenylmethane, as well as homologues thereof, such as for example, those obtainable by condensing phenols with aldehydes or ketones. Particularly valuable for the production of the adhesives embraced by this invention are polyvalent phenols, especially resorcinol, as well as also pyrocatechine, hydroquinone, pyrogallol, oxyhydroquinone and phloroglucine. Among the aldehyde components of the phenol aldehyde condensation products may be mentioned, formaldehyde and polymers thereof, as well as acetaldehyde, paraldehyde, crotonic aldehyde, furfural and the like.

With the adhesives one may incorporate, if necessary or desired, additions known in the adhesive industry, such as for example, starch, potato meal, ground potato flakes or fillers of the most varied kinds.

The application of the adhesives is carried out in the manner known for cementing or glueing together pieces of materials by means of adhesives derived from urea-aldehyde condensation products, that is to say, the adhesive solution, after the addition of a hardening agent if necessary or required, is applied to the surfaces to be cemented together. The materials thus prepared are then pressed together and if necessary or required an elevated temperature of working may be resorted to. For some purposes it may be of advantage to carry out the cementing of the pieces in such a manner that the adhesive and the hardening agents are applied separately to the surfaces to be cemented together, the pieces thereupon being placed in contact and subjected to pressure.

The bonds obtained, especially between wooden pieces, by means of the adhesives obtainable in accordance with the present invention are particularly distinguished by a very high resistance to water, which can be increased to such an extent especially by the use of polyphenols that the bonds remain stable even towards the prolonged action of boiling water.

The invention is illustrated, but not restricted by the following example.

*Example*

200 parts by weight of a 30% aqueous solution of formaldehyde are heated to 95° C. with 0.1 of one part by weight of monosodiumphosphate. A solution heated to 70° C. and consisting of 60 parts by weight of urea in 30 parts of water is then added. After the addition of 0.15 of one part by weight of trisodium phosphate the solution is evaporated in vacuo at a temperature below 50° C.

until a 35% solution of the condensation product is obtained.

To 100 parts by weight of the resulting solution, 20 parts by weight of resorcinol and 20 parts by weight of a 40% aqueous solution of formaldehyde, as well as 0.5 of one part by weight of ammonium chloride are added. A middle layer of pine wood is coated on both sides with the resulting adhesive mixture. Two binding layers of veneer are then laid on and pressed for 10 minutes at about 100° C. The resulting cemented material is stable towards boiling water.

I claim:

1. A method of preparing and applying an adhesive that comprises bringing together a urea-formaldehyde condensation product, a hardening agent therefor, and a polyhydric phenol in an aqueous solution containing free formaldehyde, and applying the resulting adhesive before it hardens.

2. A method of preparing and applying an adhesive that comprises bringing together a urea-formaldehyde condensation product, a hardening agent therefor, and resorcinol in an aqueous solution containing free formaldehyde, and applying the resulting adhesive before it hardens.

3. A method of preparing and applying an adhesive that comprises bringing together about 35 parts by weight of a urea-formaldehyde condensation product, ammonium chloride, and 20 parts by weight of resorcinol, in an aqueous solution containing free formaldehyde, and applying the resulting adhesive before it hardens.

ADOLF MENGER.